United States Patent
Hamming et al.

(10) Patent No.: US 6,619,577 B2
(45) Date of Patent: Sep. 16, 2003

(54) POSITION SENSORS FOR TAPE LOADING MECHANISM

(75) Inventors: John A. Hamming, Laguna Niguel, CA (US); Kempton W. Redhead, Huntington Beach, CA (US); Robert R. Heinze, San Clemente, CA (US); Russell A. Bauer, Garden Grove, CA (US); Patrick H. McCormack, Costa Mesa, CA (US); Turguy Goker, Solana Beach, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 87 days.

(21) Appl. No.: 09/839,232

(22) Filed: Apr. 23, 2001

(65) Prior Publication Data

US 2002/0044372 A1 Apr. 18, 2002

Related U.S. Application Data

(60) Provisional application No. 60/200,714, filed on Apr. 27, 2000.

(51) Int. Cl.[7] .............................................. G11B 15/66
(52) U.S. Cl. ................................. 242/332.1; 242/332.4; 360/95
(58) Field of Search ......................... 242/332.4, 332.1, 242/332.5, 332.8; 360/95

(56) References Cited

U.S. PATENT DOCUMENTS

| 5,093,617 A | | 3/1992 | Murata ........................ 324/235 |
| 5,739,970 A | * | 4/1998 | Kobayashi et al. ........... 360/75 |
| 6,034,839 A | | 3/2000 | Hamming .................... 360/95 |

* cited by examiner

*Primary Examiner*—John Q. Nguyen
(74) *Attorney, Agent, or Firm*—McDermott, Will & Emery

(57) ABSTRACT

A method of loading a tape from a single reel tape cartridge into a take-up reel. Position sensors detect position of a guide arm as a tape loading mechanism loads and unloads tapes from a single reel tape cartridge. The position sensors are accurate and eliminate problems that occur from small misalignments of hub filler access with the access of the take-up reel. Further, the position sensors enable the hub filler to consistently attach to a leader pin at the end of the tape of the single reel tape cartridge without frequent malfunctions.

18 Claims, 18 Drawing Sheets

POSITION SENSORS FOR TAPE LOADING MECHANISM

RELATED APPLICATIONS

This application claims priority from U.S. provisional patent application Ser. No. 60/200,714, filed Apr. 27, 2000, which is incorporated herein by reference.

FIELD OF THE INVENTION

The present invention relates to a method and apparatus for sensing the position of a hub filler of a tape drive between a single reel tape cartridge and a take-up reel.

DESCRIPTION OF RELATED ART

Single reel tape cartridges are used to transport and store tape for reel-to-reel tape drives. A single reel tape cartridge is inserted into a tape drive and a mechanism is used to load the end of the tape into a take-up reel from the tape cartridge. Once the end of the tape is loaded into the take-up reel, the tape drive operates as a reel-to-reel tape drive. A motor is coupled to the take-up reel to rotate the take-up reel about the take-up reel axis and another motor is coupled to the single reel tape cartridge to rotate the reel of the tape cartridge about its axis.

The tape drive loading mechanism attaches to a tape leader pin. The tape leader pin is located at the end of the tape which is contained in the single reel tape cartridge. A slot in the hub filler is used for receiving the tape leader pin. The hub filler is driven by a guide arm between the single reel tape cartridge and the take-up reel. An example of a mechanism for driving the hub filler between the tape cartridge and the take-up reel is disclosed in U.S. Pat. No. 6,034,839.

FIG. 1 is a view of the tape drive loading mechanism disclosed in U.S. Pat. No. 6,034,839. The hub filler 300 enters into the cartridge 210 and attaches to the end of the tape. The hub filler 300 then moves along a guide rail 247, driven by the guide arm 250. Typically, the hub filler 300 attaches to the end of a tape in the tape cartridge 210 and the guide arm 250 moves the hub filler 300 along the guide rail 247, trailing the tape across the read/write head 222 and into the take-up reel 242. The hub filler 300 enters the take-up reel 242 through a channel 244 and into the hub 245 of the take-up reel 242.

FIG. 2 is a top view of the tape drive, depicting the hub filler 300 in the take-up reel 242 with the tape 216 attached. The tape 216 passes across the read/write head 222 and the end of the tape 216 is secured to the take-up reel 242. The tape drive is then operated by rotation of the take-up reel 242 and the single reel of the cartridge 210 about their respective axes to move the tape 216 across the read/write head 222. Motors are used to rotate the take-up reel 242 and the single reel of the cartridge 210, controlling the speed of the tape 216 as it moves across the read/write head 222. The hub filler 300 pivots on an axle 252 that is coupled to the guide arm 250. This pivoting is necessary for the hub filler 300 to be guided on the guide rail 247 into the take-up reel 242. Once the hub filler 300 is in the take-up reel 242, with the tape 216 attached, the take-up reel 242 rotates to thereby unload the tape from the cartridge 210. The hub filler 300 rotates with the take-up reel 242 on the axle 252. The loading mechanism attempts to align the axle 252 axis and the take-up reel 242 axis perfectly.

There are some concerns regarding the tape drive loading mechanism described above. Perfectly aligning the hub filler's axle axis and the take-up reel axis is very difficult to do, due to mechanical tolerances. Misalignment can cause minor imbalances during rotation of the take-up reel; these minor imbalances can create small speed variations in the tape wind and unwind speeds. These variations in speed are difficult for the motors of the take-up reel and cartridge reel to compensate for. Hence, the variations in speed deter from the quality of the reading and writing of the tape at the read/write head. Additionally, misalignment of the hub filler axis and the take-up reel axis reduce the life of the bearings in the take-up reel. Worn bearings will produce vibrations and result in noise during recording and reading at the read/write head.

Controlling the hub filler at the single reel tape cartridge to attach to a tape leader pin is somewhat difficult to consistently accomplish. This difficulty arises from the circumstance that the tape leader pin is very small and the slot in the hub filler for receiving the tape leader pin is very small. Small misalignments or miscalibrations of the movement of the hub filler at the single reel tape cartridge may cause a failure of the hub filler to pick up the tape leader pin and thereafter load the tape from the tape cartridge onto the take-up reel. Hence, misalignment of the hub filler at the single reel cartridge can cause a malfunction in the tape drive loading mechanism and therefore make the tape drive loading mechanism unreliable.

SUMMARY OF THE INVENTION

There is a need for a tape drive loading mechanism with the ability to sense the precise position of the hub filler during loading and unloading of tape from a removable tape cartridge.

These and other needs are met by embodiments of the present invention, which provide sensors for sensing the precise position of a guide arm. More specifically, the present invention relates to an apparatus for loading a take-up reel with tape from a removable tape cartridge. The apparatus comprises a hub filler for transporting an end of the tape from the tape cartridge to the take-up reel. The hub filler is driven by a guide arm along a guide rail from the removable tape cartridge into the take-up reel. The apparatus also comprises at least one sensor for detecting the position of the hub filler. The tape loading mechanism of the present invention uses feedback from the at least one sensor to control the motor that drives the guide arm that drives the hub filler. The present invention has the advantage of utilizing the feedback from at least one of the sensors in a precise manner to detect and utilize the exact position of the hub filler to reliably attach and detach the hub filler to the tape leader pin at the removable tape cartridge and to precisely align the axle of the hub filler in the take-up reel. The present invention also eliminates the need for the tape loading device to rely on encoded motor positions, which can be miscalibrated, to position the hub filler.

There are several advantages of the present invention. The present invention enables the hub filler axis and the take-up reel axis to be precisely aligned as the hub filler attaches to the take-up reel. The present invention mitigates imbalances during rotation of the take-up reel. These imbalances create small speed variations in the tape wind and unwind speeds as a result of the misalignment of the hub filler axis and the take-up reel axis. Another related advantage of the present invention is that the bearings are not damaged due to the misalignment of the hub filler axis and the take-up reel axis. Worn bearings produce vibrations that cause noise in the read/write head during reading and writing of the tape. Yet another advantage of the present invention is that the hub filler can attach to the leader pin consistently and reliably, as the position of the hub filler and the timing of the gearing mechanisms can act cooperatively to efficiently and effectively enable the attachment of the leader pin to the hub filler. The above-listed advantages are examples and not exclusive.

The foregoing and other features, aspects, and advantages of the present invention will become more apparent from the following detailed description of the present invention, taken in conjunction with the accompanying drawings.

DETAILED DESCRIPTION OF THE INVENTION

The present invention relates to an apparatus for sensing the position of a hub filler at a cartridge and a take-up reel of a tape drive. The cartridge of the present invention is a removable single reel cartridge and it is necessary for the tape drive to load the end of a tape from the cartridge to the take-up reel. A hub filler, which is part of the tape drive, receives the end of the tape from the cartridge. A sensor located proximate to the cartridge detects the precise position of the hub filler and serves to calibrate the hub filler as it receives the end of the tape from the cartridge. After the hub filler has attached to the end of the tape in the cartridge, usually by attaching to a leader pin that is connected to the end of the tape, the hub filler moves along a guide rail pulling the tape out of the cartridge, across the read/write head, and into the take-up reel. The hub filler enters the take-up reel, with the tape attached, bringing the hub filler to the hub of the take-up reel. Upon the hub filler attaching to the take-up reel, the tape is connected to both the single reel of the cartridge and the take-up reel. A sensor located proximate to the take-up reel detects the position of the hub filler serving to calibrate the attachment of the hub filler to the take-up reel in a precise manner. The rotation of the reel of the tape cartridge and the take-up reel controls the movement of the tape across the read/write head and consequently the reading of the tape. A guide arm drives the hub filler between the cartridge to the take-up reel.

Figure 1:
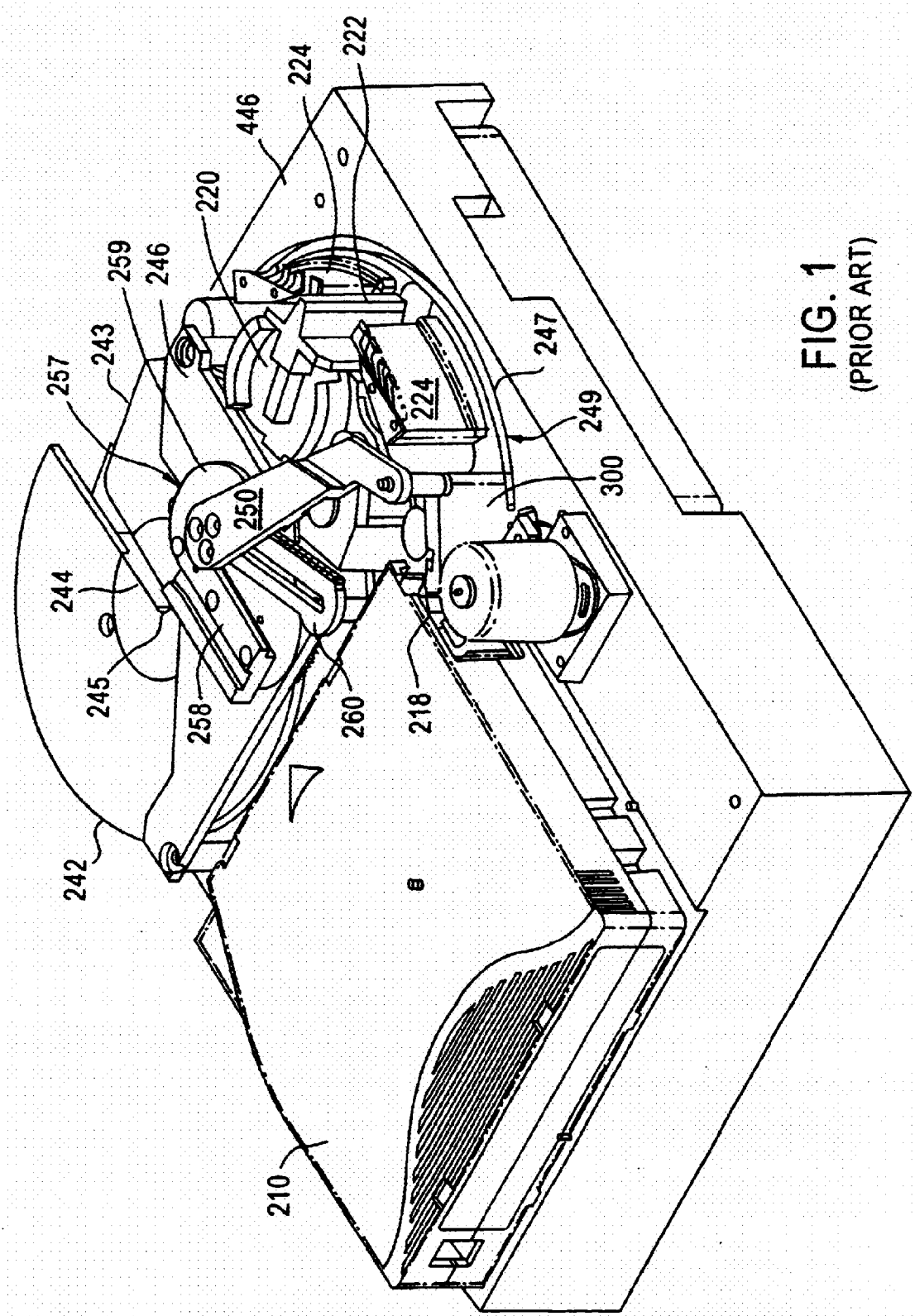
FIG. 1 is a view of a tape drive loading mechanism.
Figure 2:
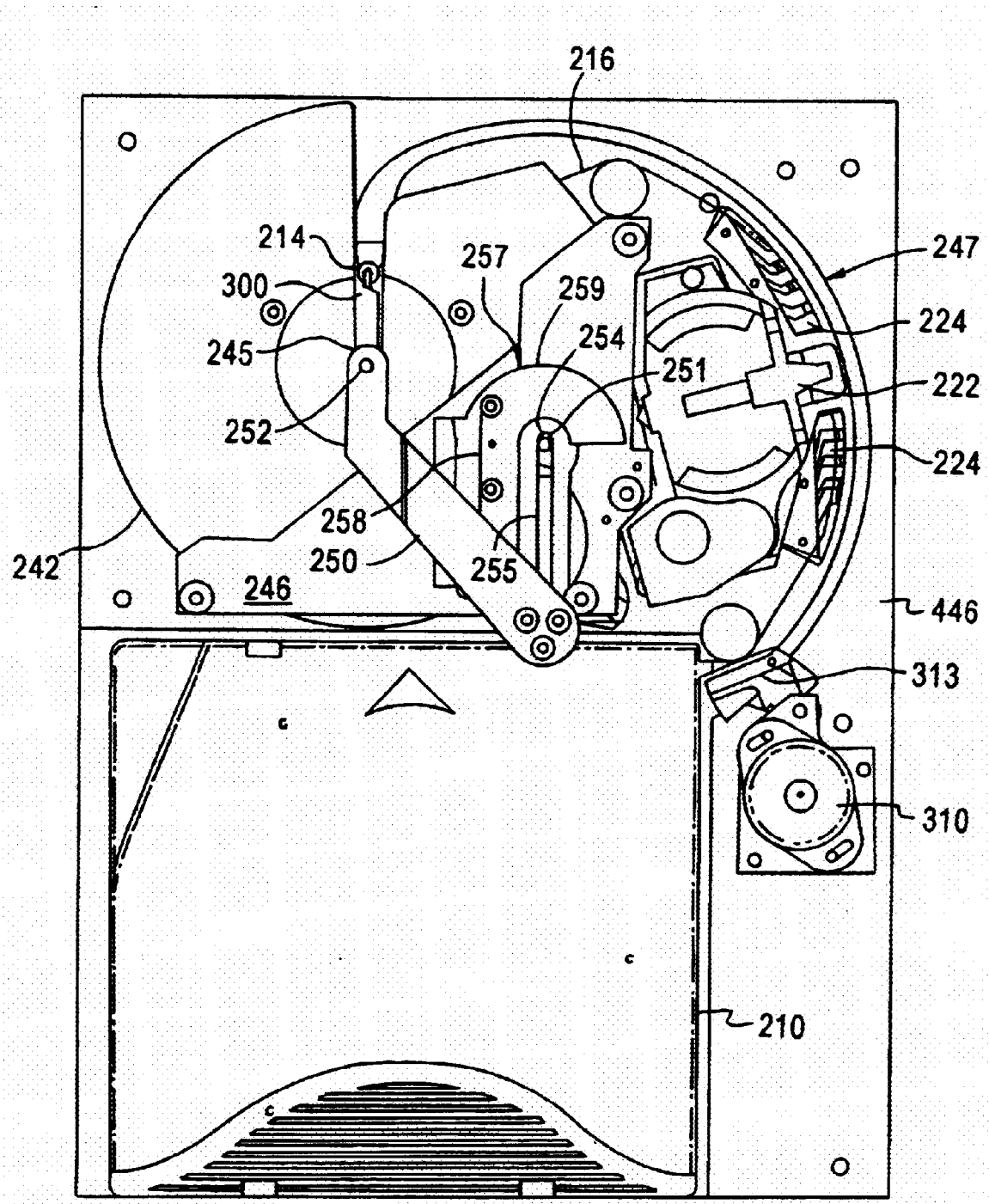
FIG. 2 is a top view of the tape drive loading mechanism of FIG. 1.
Figure 3:
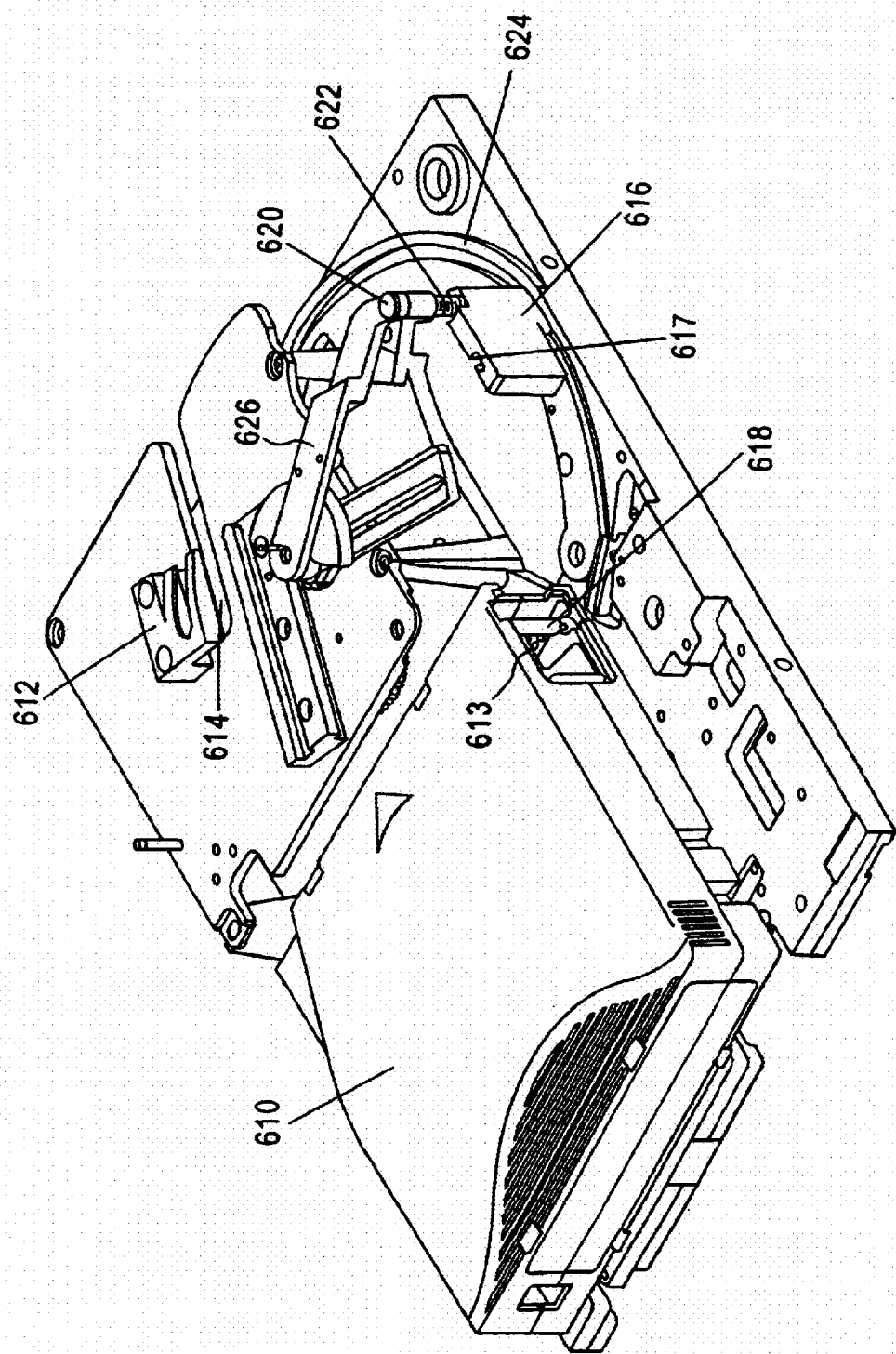
FIG. 3 is a perspective view of the tape drive loading mechanism of the present invention.

FIG. 3 is a perspective view of the tape drive loading mechanism of the present invention. A removable single reel tape cartridge 610 is shown positioned in the tape drive. The tape 613 is wound on a reel inside the cartridge 610 and the end of the tape 613 is attached to a leader pin 618. A hub filler 616 moves along a guide rail 624, driven by a guide arm 626, between the cartridge 610 and a take-up reel 614. The hub filler 616 pivots on an axle 620. The hub filler 616 is held to the guide rail 624 by pressure from a spring 622 as the hub filler 616 moves along the guide rail 624 to and from the tape cartridge 610 and the take-up reel 614. The hub filler 616 also includes a slot 617 that attaches to the leader pin 618 when entering the cartridge 610. As the hub filler 616 enters the take-up reel 614, the axle 620 is lifted from the hub filler 616 by a ramp 612 that de-couples the axle 620 from the hub filler 616.

Other mechanisms can be used to de-couple the axle 620 from the hub filler 616 within the scope of the invention. For example, one embodiment that may be used to de-couple the axle 620 from the hub filler 616 is a spring mechanism that manipulates spring tension at the take-up reel 614 to lift the axle 620 out of the hub filler 616. Other embodiments include a snap coupling arrangement, and a latch and release arrangement. Still another embodiment that may be used to de-couple the axle 620 is a motor lifting the axle 620 out of the hub filler 616. The above-described embodiments for lifting the axle 620 out of the hub filler 616 are not exclusive.

Figure 4:
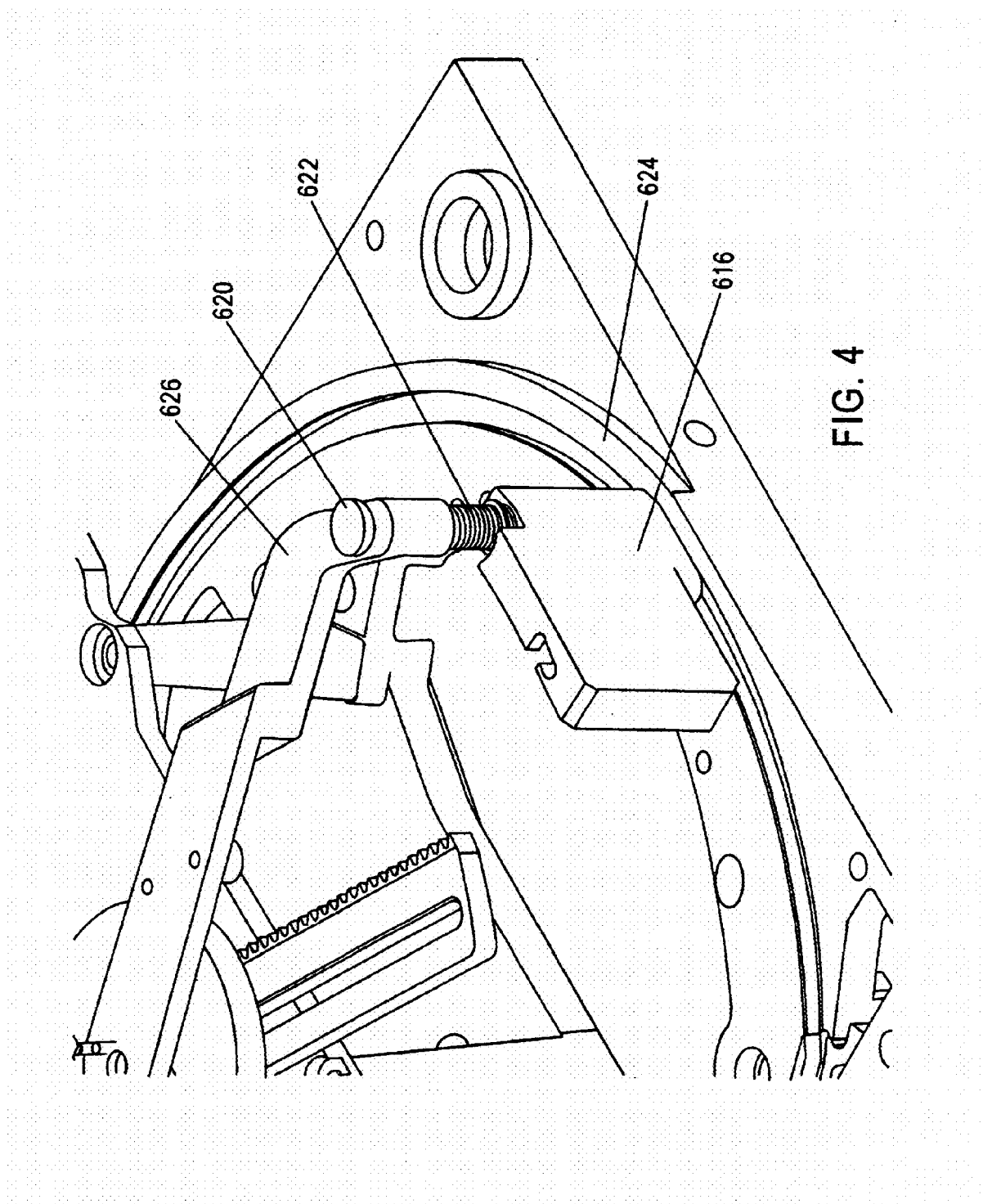
FIG. 4 is a perspective view of the hub filler on the guide rail.

FIG. 4 is a perspective, enlarged view of the hub filler 616 on the guide rail 624 between the tape cartridge 610 and the take-up reel 614. The hub filler 616 is held to the guide rail 624 by the spring 622 disposed around the axle 620. The spring 622 creates tension between the hub filler 616 and the guide arm 626. The axle 620 is moveable in the vertical direction and rotatable in a bore of the guide arm 626. The top of the axle 620 has a portion that is larger than the bore of the guide arm 626. The guide arm 626 moves in a horizontal plane during travel between the cartridge 610 and the take-up reel 614. The spring 622 between the guide arm 626 and the hub filler 616 exerts downward pressure (as viewed in FIG. 4) on the hub filler 616, pressing the hub filler 616 against the guide rail 624. This ensures that the hub filler 616 stays on the guide rail 624 during travel from the cartridge 610 to the take-up reel 614. The spring 622 is attached to a notch in the axle 620 and pushes the axle 620 into the hub filler 616. When the axle 620 is pulled out of the hub filler 616, the tension of the spring 622 is increased.

Figure 5:
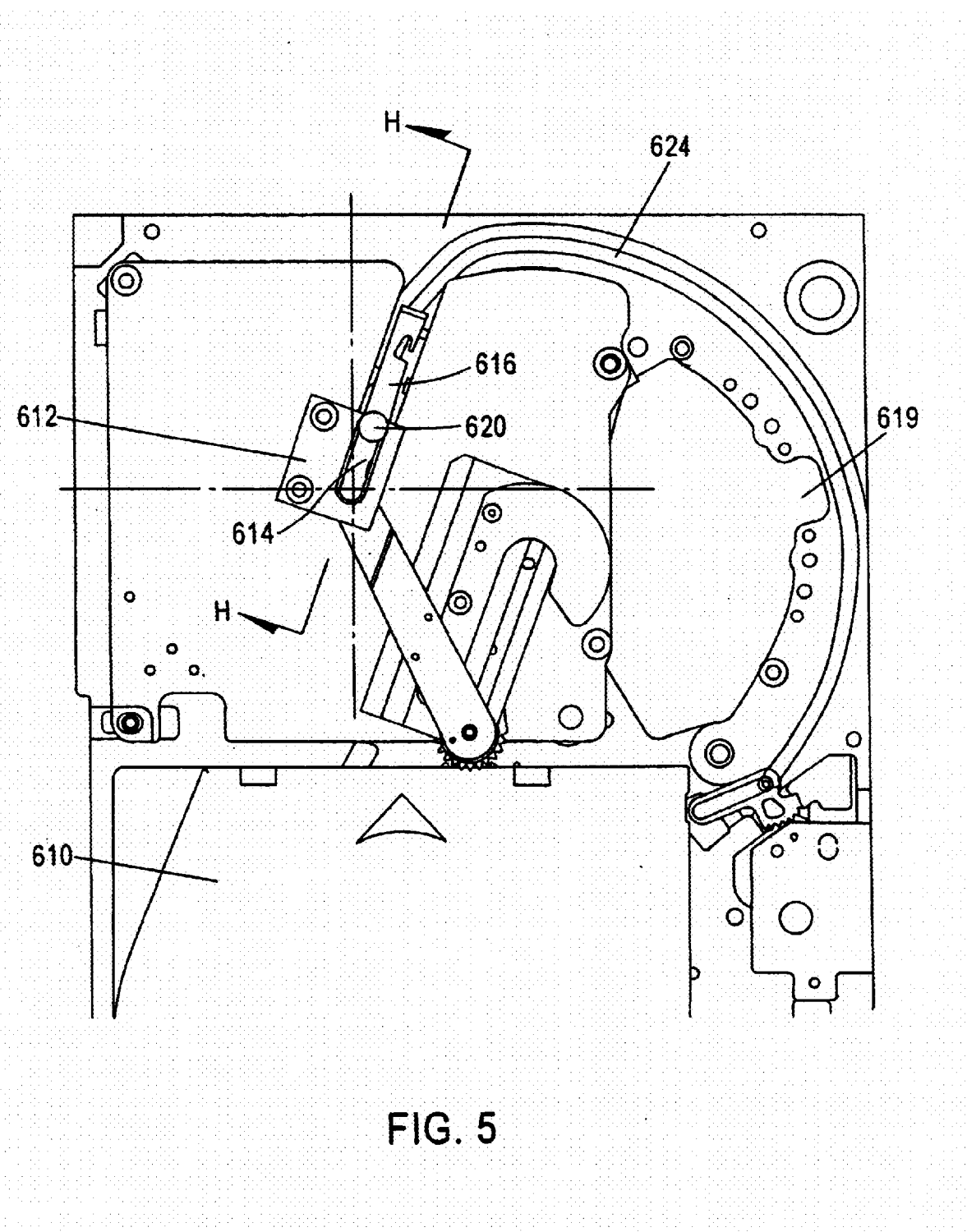
FIG. 5 is a top view of the tape drive loading mechanism of the present invention.

FIG. 5 is a top view of the tape drive loading mechanism of the present invention. The single reel tape cartridge 610 is shown inserted in the tape drive. The hub filler 616 is shown entering the take-up reel 614, but not yet fully inserted. The axle 620 is shown at the entering position of the ramp 612. The hub filler 616 travels from the cartridge 610 to the take-up reel 614 along the guide rail 624, pulling tape from the cartridge 610 across a read/write head 619.

Figure 6:
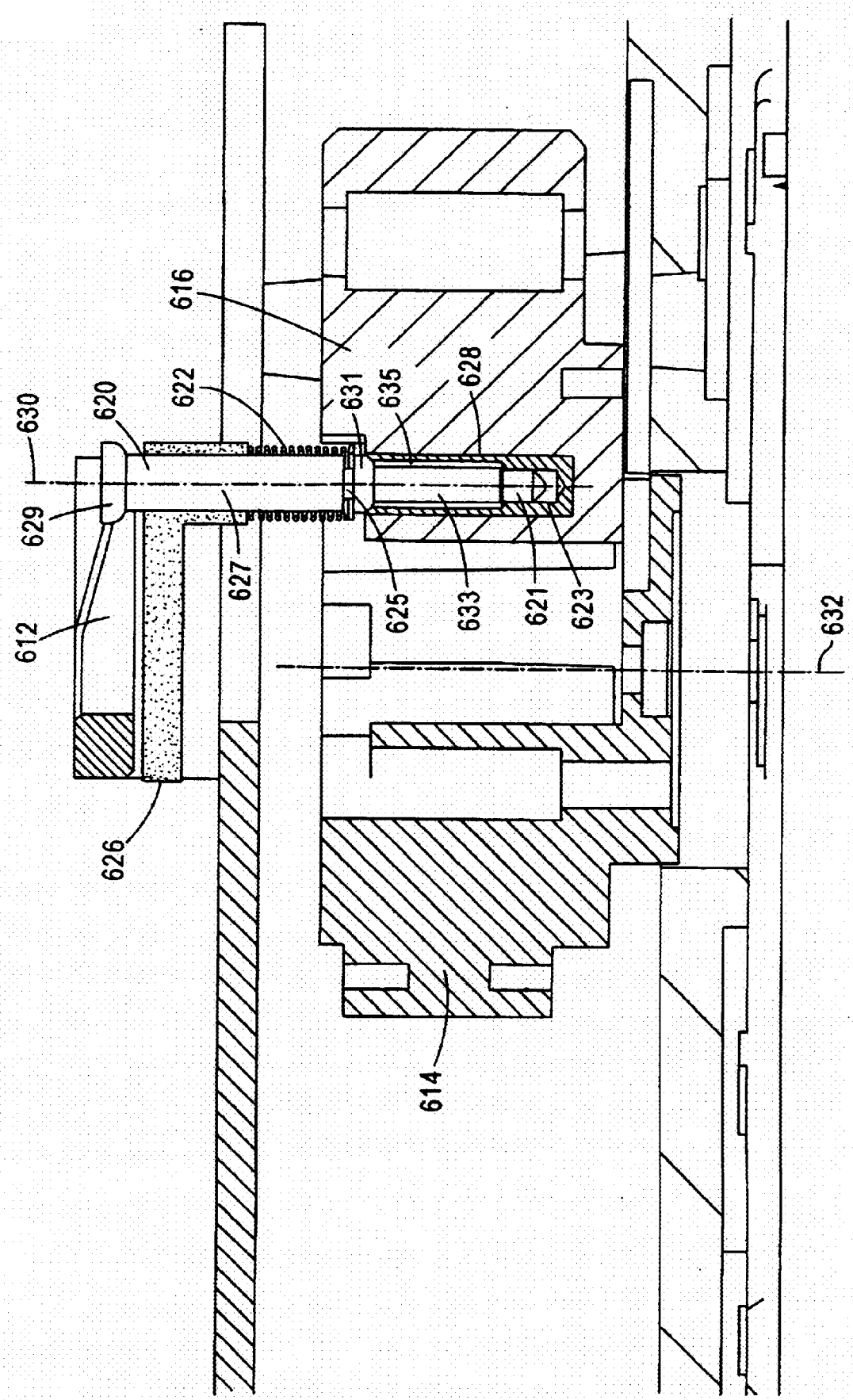
FIG. 6 is a side view of the hub filler entering the take-up reel.

FIG. 6 is a side view of the hub filler 616 just entering the take-up reel 614. The side view of the hub filler 616 shows the axle 620 in a sheath 628 of the hub filler 616. Since the sheath 628 and the axle 620 are cylindrical, the hub filler 616 is able to pivot about the axle 620 as the hub filler 616 travels along the bends of the guide rail 624. A small shaft 621 of the axle 620 and a small bore 623 of the sheath 628 fit snugly together, such that the hub filler 616 pivots about the axle 620 and is tightly controlled by the movement of the guide arm 626. The spring 622 is attached to the axle 620 at a notch 625 in the axle 620. The other end of the spring 622 presses against the guide arm 626, creating tension and pushing the axle 620 into the sheath 628 of the hub filler 616. The axle axis 630 is the axis about which the hub filler 616 pivots during travel along the guide rail 624.

As will be explained in more detail with respect to FIGS. 7–9, the axle 620 is de-coupled from the hub filler 616 by the ramp 612, so that the hub filler 616 can rotate freely on the axis of the take-up reel 614 during winding and unwinding of the tape. The large shaft 627 of the axle 620 is rotatable inside the bore 613 of the guide arm 626. Above the large shaft 627 of the axle 620 is a top section 629 of the axle 620. As the hub filler 616 enters the take-up reel 614, the axle top section 629 contacts the ramp 612 and the axle 620 is lifted out of the hub filler 616. When the hub filler 616 is not in the take-up reel 614, the axle 620 is in the hub filler 616 and the hub filler 616 is tightly pivoting on the axle 620. A small spherical stop 631 interacts with the top of a large bore 635 to limit movement of the axle 620 into the sheath 628.

Figure 7:
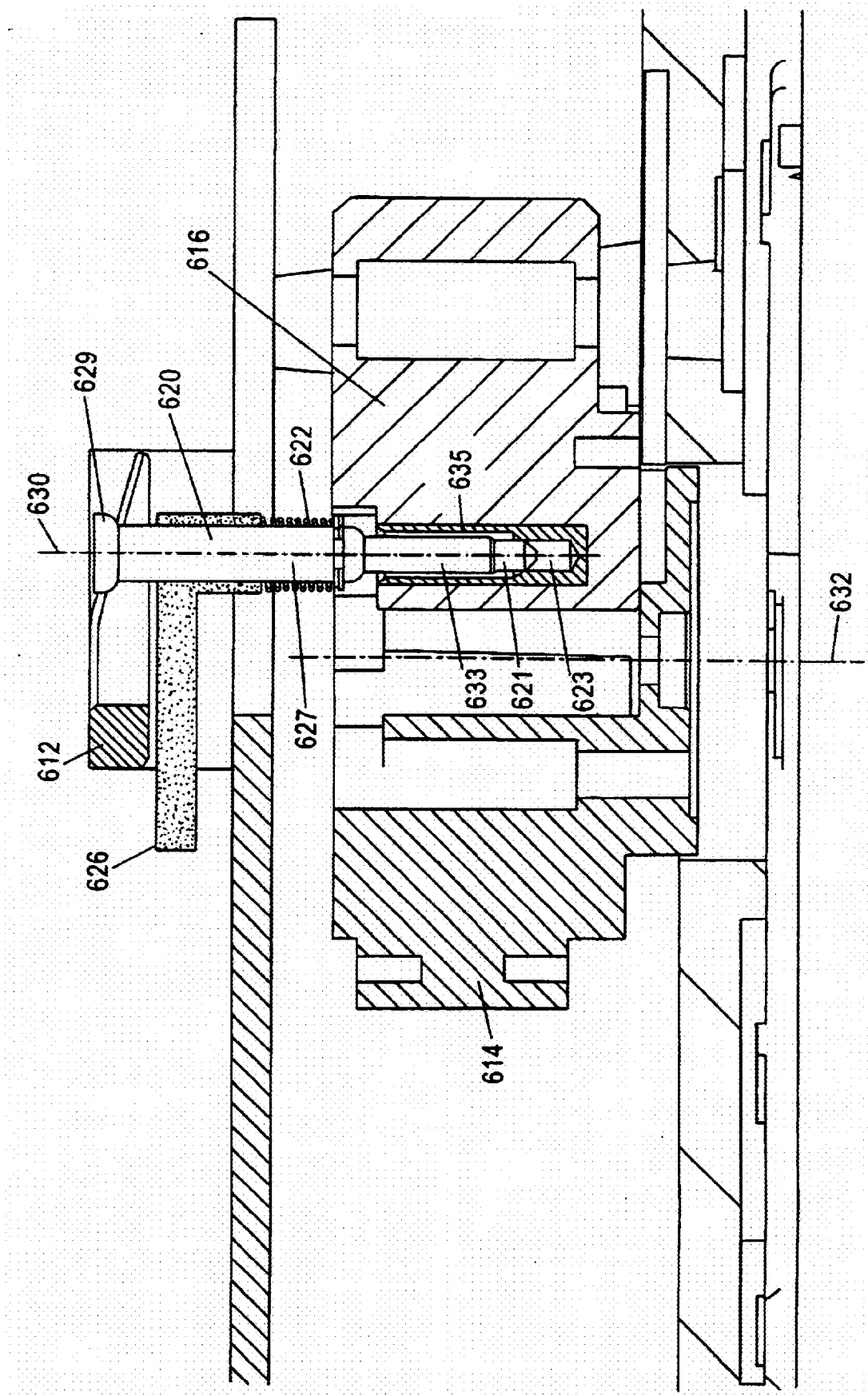
FIG. 7 is a side view of the hub filler entering the take-up reel and decoupling from the guide arm.

FIG. 7 is a side view of the hub filler 616 entering the take-up reel 614. The axle top section 629 and the axle 620 are lifted up the ramp 612 as the hub filler 616 moves into the take-up reel 614 driven by the guide arm 626. This causes the axle 620 to partially lift out of the hub filler 616. The small shaft 621 is almost, but not completely, removed from the small bore 623. The axis 630 of the axle 620 is now closer to the axis 632 of take-up reel 614 than shown in FIG. 6.

Figure 8:
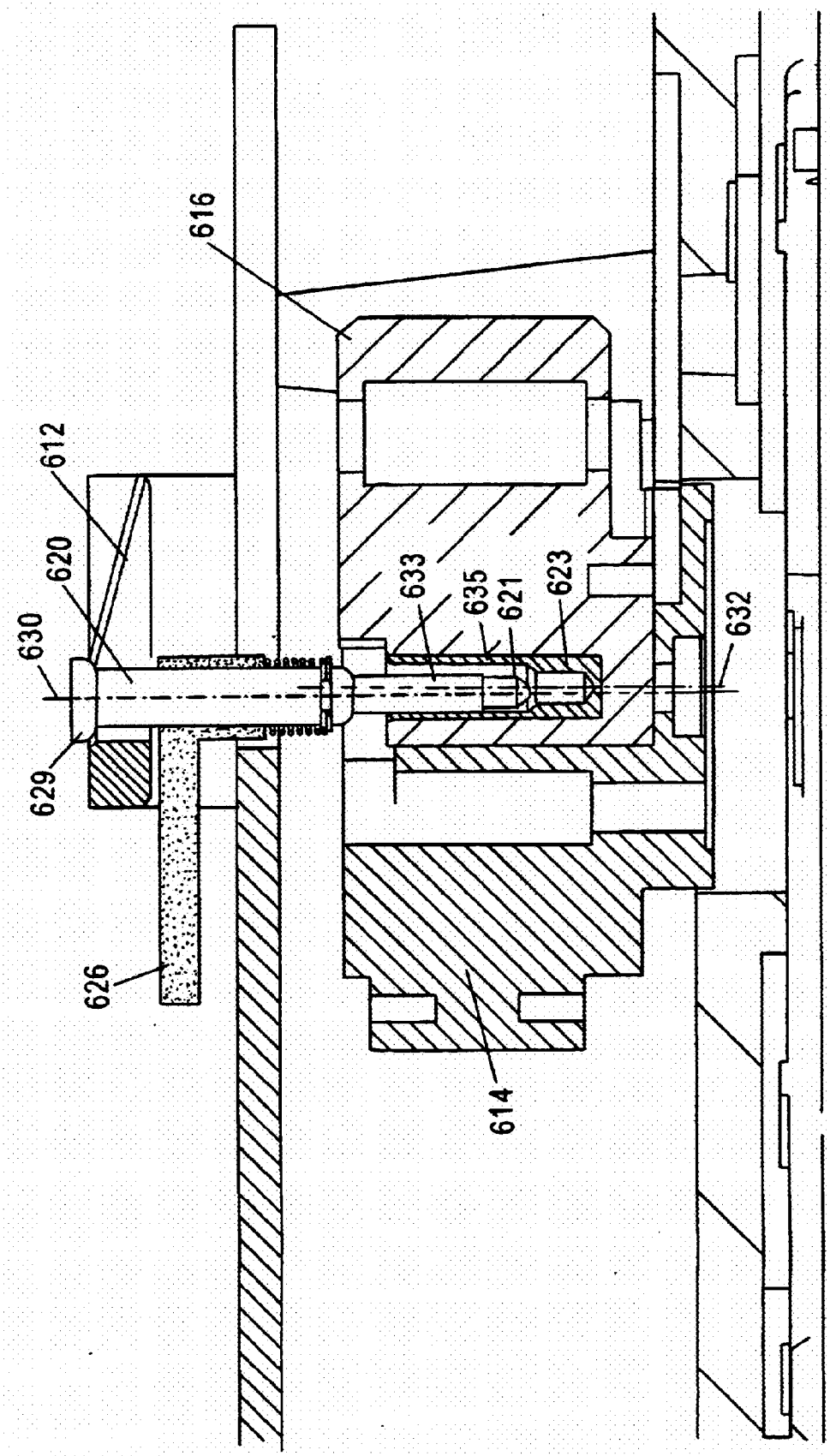
FIG. 8 is a side view of the hub filler completely lodged in the take-up reel.

FIG. 8 is a side view of the hub filler 616 in the take-up reel 614. The hub filler 616 is fully inserted in the take-up reel 614 due to the continued movement of the arrangement by the motor and linkage. In the illustrated embodiment, the axle 620 is lifted up by the ramp 612 and a main shaft portion 633, of larger diameter than small shaft 621, pushes the hub filler 616 completely into the take-up reel 614 by pushing against one side of the large bore 635. The small shaft 621 has been completely lifted out of the small bore 623 to de-couple the small shaft 621 from the small bore 623. This allows some freedom of movement of the axle 620 in the hub filler 616. The main shaft portion 633 is only able to push the hub filler 616 through contact with the large bore 635, when the small shaft 621 is not de-coupled from the small bore 623. At this point, the guide arm 626 has pushed the hub filler 616 to the extreme end of the channel in the take-up reel 614. The axle 620 is still in contact with the hub filler 616 and not de-coupled from the hub filler 616. The axis 630 of the axle 620 is not aligned with the axis 632 of the take-up reel 614. In certain embodiments of the invention, the take-up reel 614 will rotate several times while the main shaft portion 633 is still in contact with the large bore 635.

Figure 9:
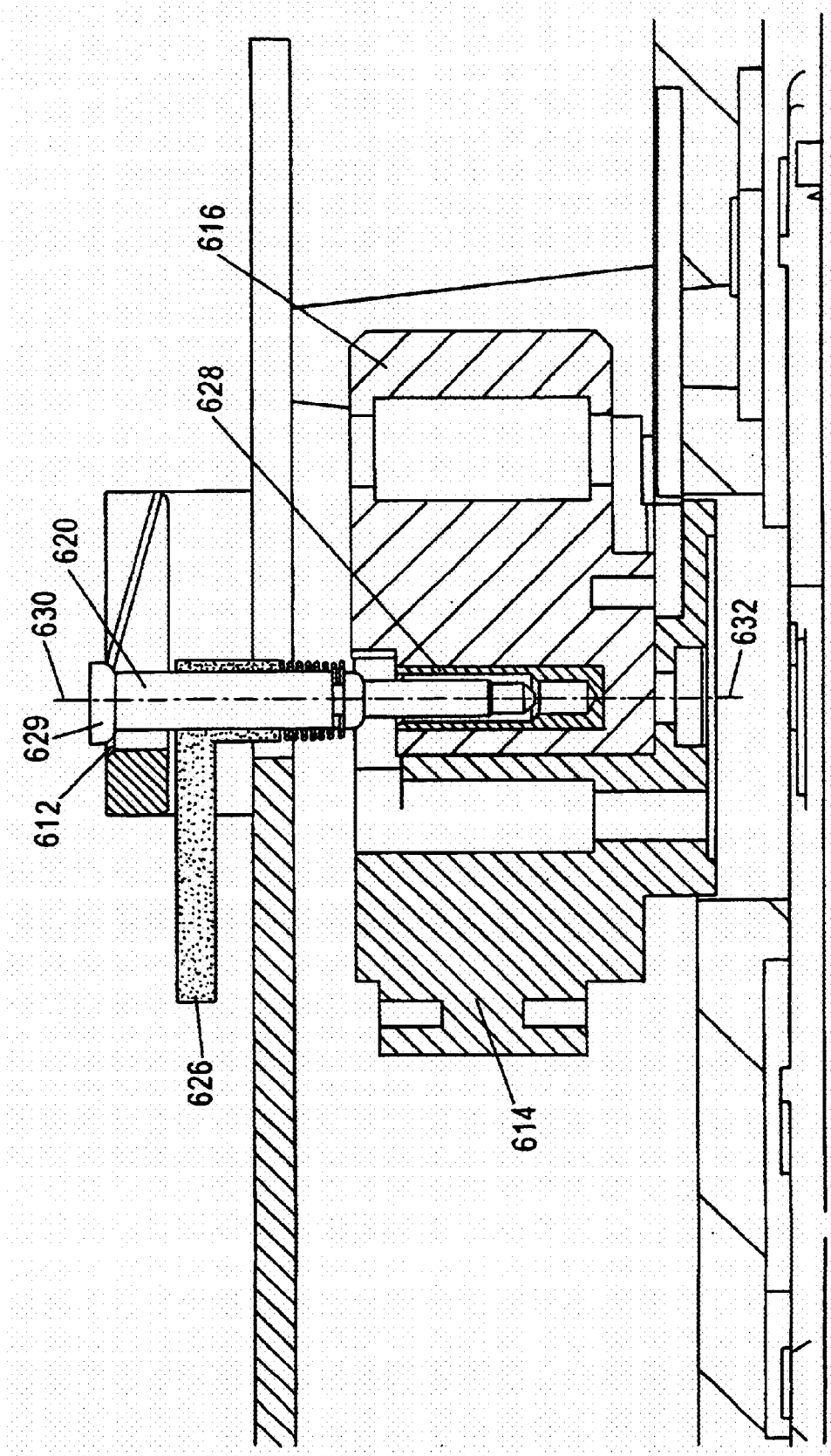
FIG. 9 is a side view of the hub filler in the take-up reel and decoupled from the guide arm.

FIG. 9 is a side view of the hub filler 616 in the take-up reel 614 when it is fully decoupled from the guide arm 626. The axle 620 is now centered in the sheath 628 such that the axis 630 of the axle 620 and the axis 632 of the take-up reel 614 are aligned. Since the guide arm 626 is fully de-coupled from the hub filler 616, the take-up reel 614 is able to rotate freely around the axis 632, immune from any small misalignments between the axle axis 630 and the take-up reel axis 632. This relative immunity helps prevent small speed variations and wearing down of the bearings.

In certain embodiments of the invention, the guide arm 626 is driven by a motor (not shown) with an encoder. The motor has encoded positions for positioning of the guide arm 626 throughout the loading and unloading of the tape; such positioning can include attachment of the tape 613 at the cartridge 610, movement along the guide rail 624 into the take-up reel 614, the de-coupling movements in the take-up reel 614, recoupling movements of the guide arm 626 with the hub filler 616, return of the tape to the cartridge 610, and detachment movements of the tape from the hub filler 616. Small misalignments due to the encoded motor position or other mechanical tolerations are immune in the take-up reel 614, as the axle 620 is de-coupled from the hub filler 616 during rotation of the take-up reel 614 during the reading and writing of the tape 613 in the tape drive.

Figure 10:
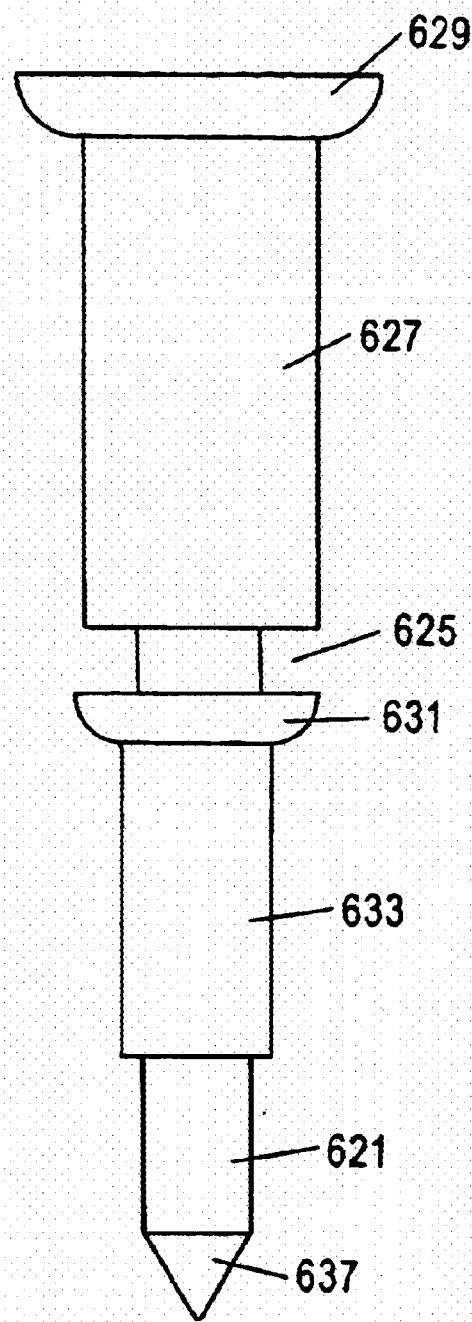
FIG. 10 is a side view of the axle.

FIG. 10 is a side view of the axle 620. The axle top section 629 is above the large shaft 627 which is above the notch 625 for the spring. The notch 625 for the spring is above the small spherical stop 631. The small spherical stop 631 is above the main shaft 633. The medium shaft 633 is above the small shaft 621. The small shaft 621 is above the axle point 637.

Figure 11:
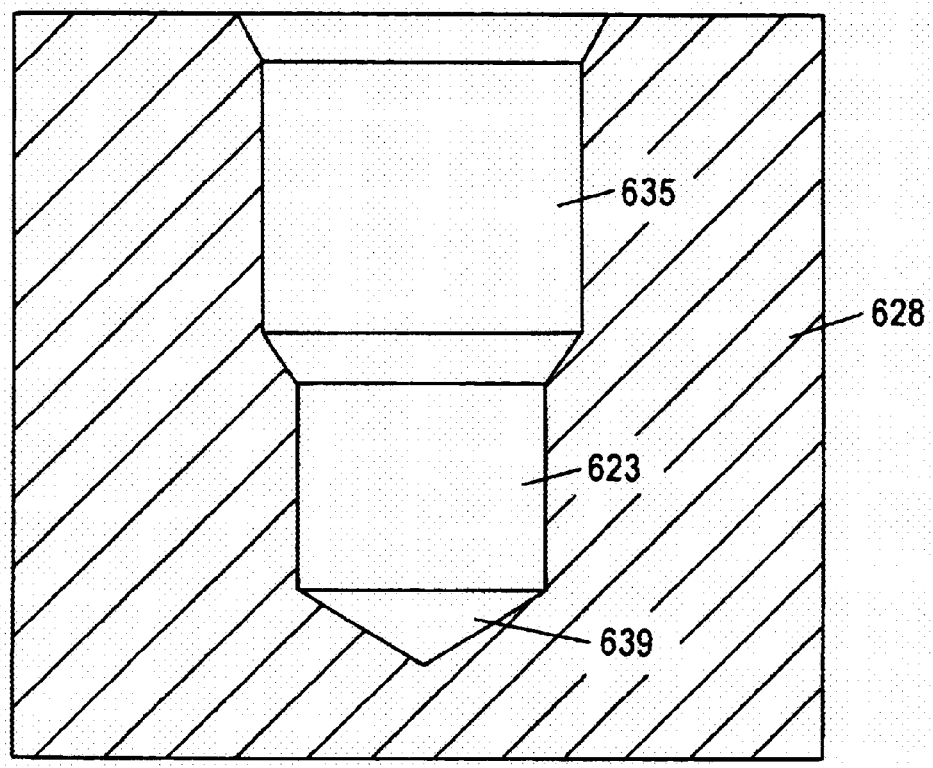
FIG. 11 is a side view of the shaft in the hub filler for receiving the axle.

FIG. 11 is a side view of the shaft 628 of the hub filler 616. The large bore 635 is above the small bore 623. The small bore 623 is above the axle's point receiver 639.

Figure 12:
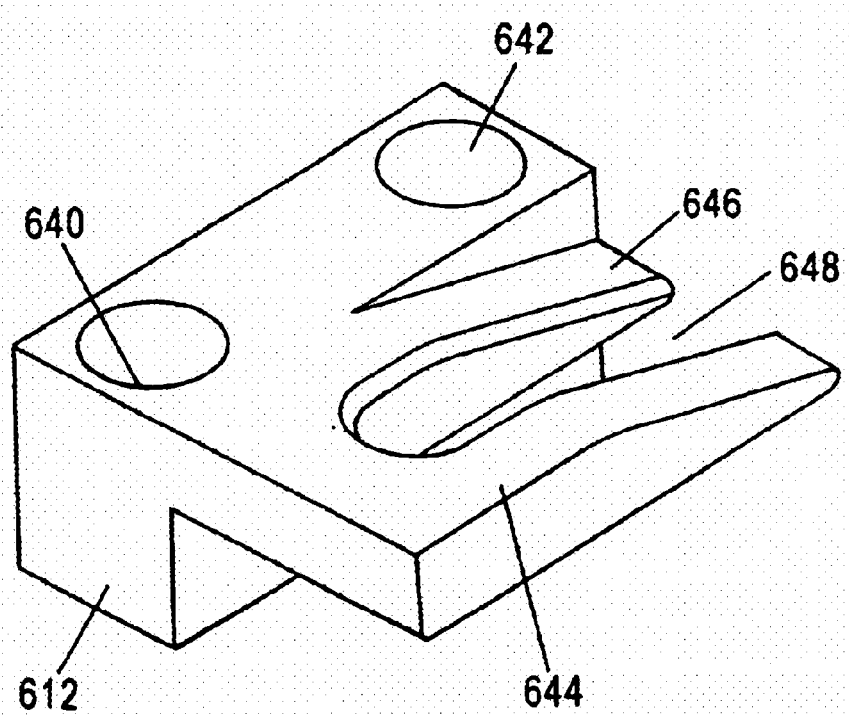
FIG. 12 is a view of the ramp.

FIG. 12 is a top perspective view of the ramp 612. The ramp 612 has a first bore 640 and a second bore 642 for attachment of the ramp 612 above the take-up reel 614. The ramp 612 has diagonal regions 646 and a plateau region 644. A channel 648 in the ramp 612 is disposed in the plateau region 644 and between the diagonal regions 646. As the axle 620 enters the channel 648 of the ramp 612, the top section 629 of the axle 620 is positioned between the diagonal regions 646 to catch on the ramp 612. The large shaft 635 travels inside the channel 648 as the axle 620 is lifted out of the hub filler 616 by the ramp 612.

Figure 13:
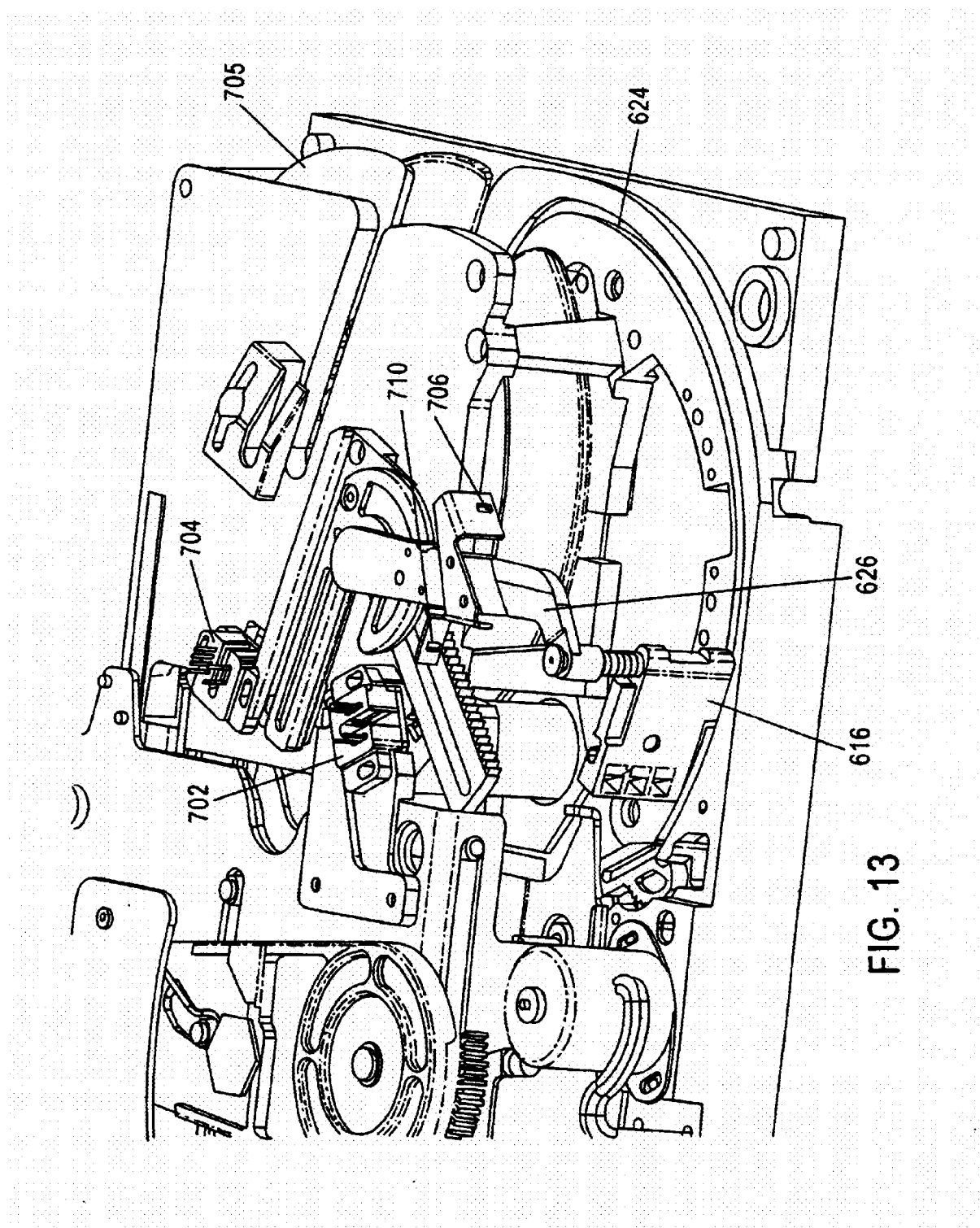
FIG. 13 is an oblique view of the tape loading mechanism comprising two position sensors.

FIG. 13 is an oblique perspective of embodiments of the present invention utilizing position sensors to detect the position of a hub filler during loading and unloading of tape from a removable tape cartridge to a take-up reel. These embodiments of the present invention include position sensors 702, 704 and tabs 706, 710. The tabs 706, 710 interfere with the position sensors 702, 704 to produce a feedback signal indicative of the precise position of the hub filler 616. In some of the embodiments, the tape loading mechanism includes one position sensor 702 for detecting the exact position of the hub filler 616 as the hub filler 616 is inserted into a removable tape cartridge (not shown) and another position sensor 704 for sensing the exact position of the hub filler 616 when the hub filler 616 is inside the take-up reel 705. The sensors 702, 704 cooperate with tabs 706, 710 in the respective positions. The tabs 706, 710 are attached to the guide arm 626 which drives the hub filler 616 along the guide rail 624. One sensor 702 is positioned proximate to the location along the guide rail 624 where the hub filler 616 attaches to a tape leader pin (not shown). The tab 710 is attached to the guide arm 626 and aligned such that the tab 710 enters the position sensor 702 when the hub filler 616 is in position to attach or detach a leader pin. Likewise, position sensor 704 is attached to the tape loading mechanism proximate to the take-up reel 705. When the hub filler 616 is positioned inside the take-up reel, tab 706 is aligned such that tab 706 is inserted into the position sensor 704.

Figure 14:
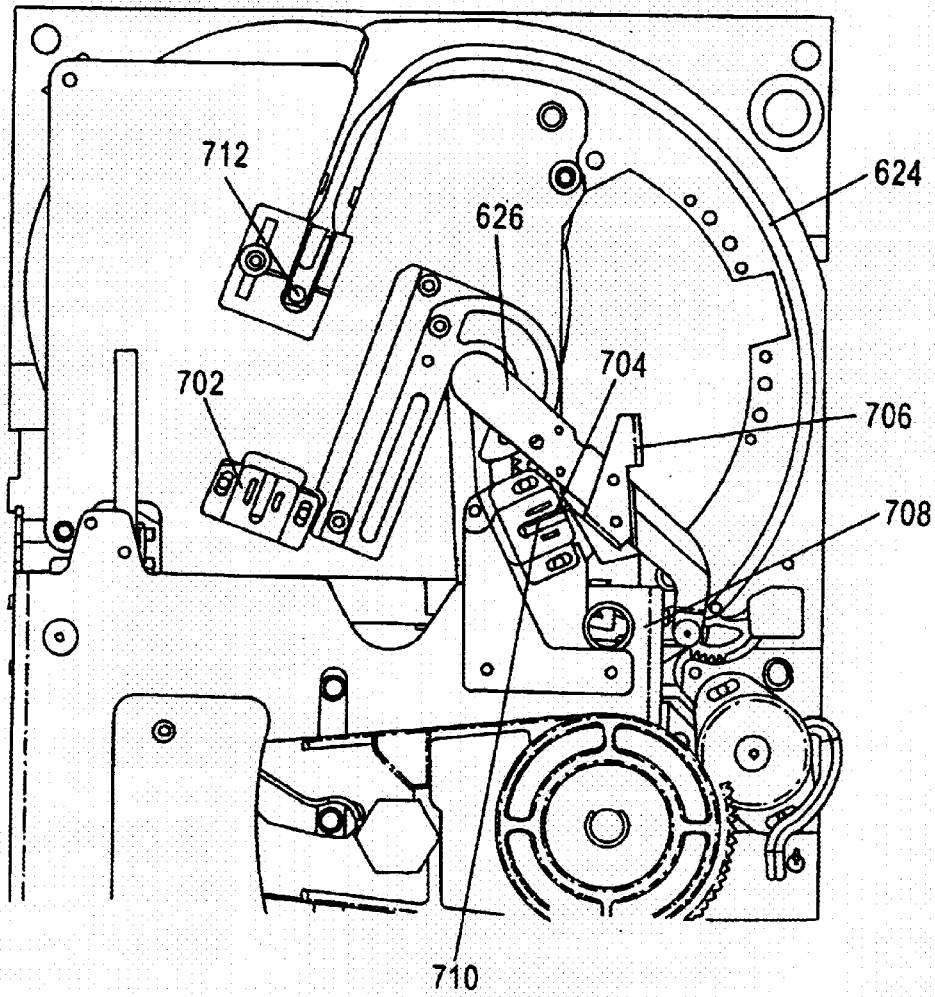
FIG. 14 is a top view of the tape loading mechanism with the hub filler in position for attachment to a tape leader pin and its position being detected by a sensor.

FIG. 14 is a top view of the tape loading mechanism of the present invention. FIG. 14 depicts the hub filler 616 in position to attach or detach from a leader pin. Accordingly, tab 710 is inside position sensor 704.

Figure 15:
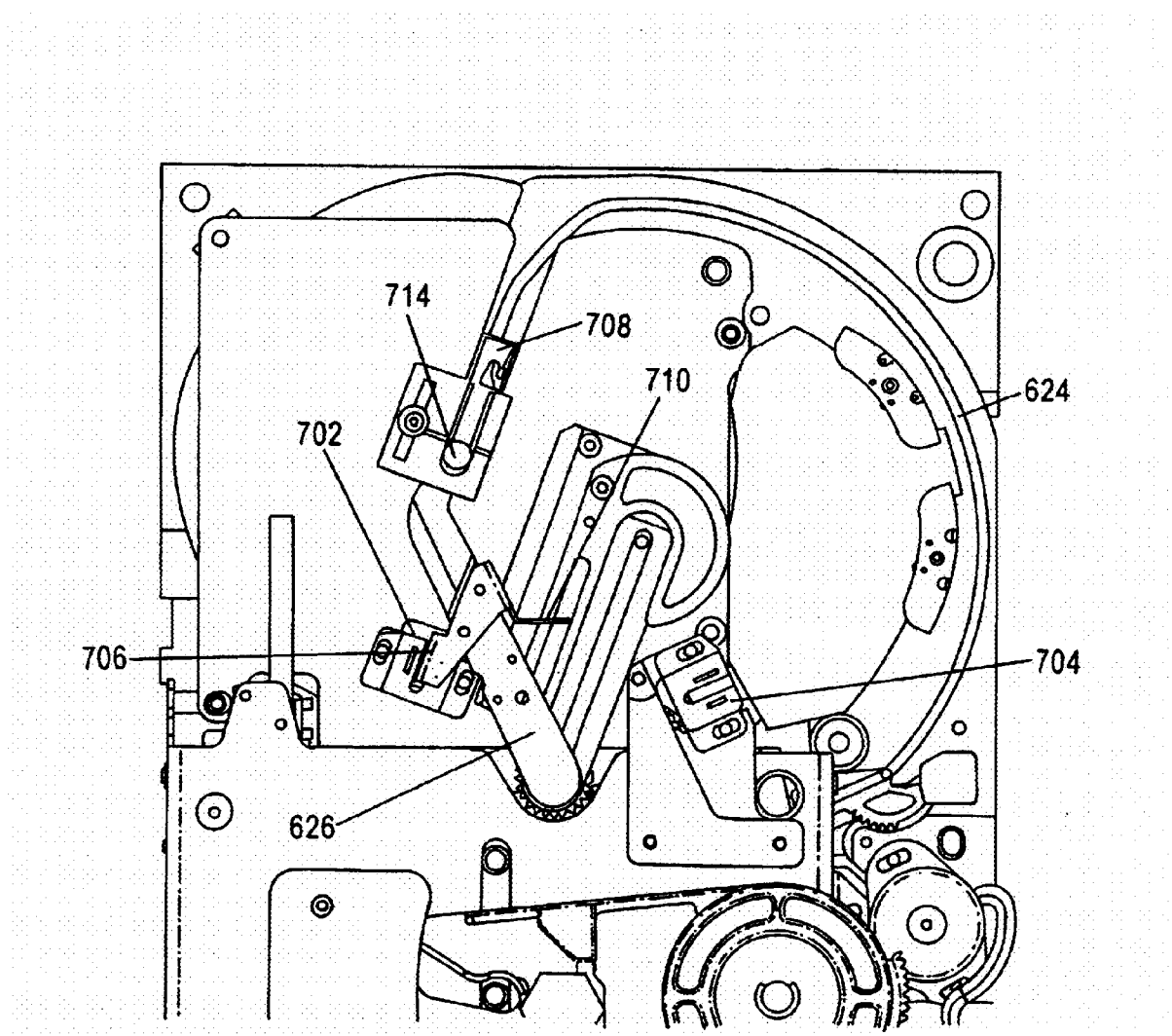
FIG. 15 is a top view of the tape loading mechanism with the hub filler attached to the take-up reel with its position being detected by a sensor.
Figure 16A:
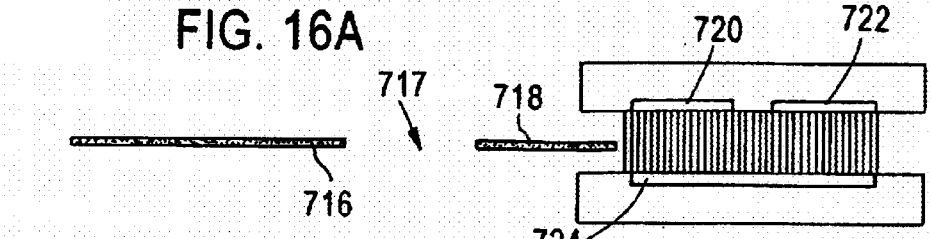
FIGS. 16A–16G show cross-sectional diagrams of a tab interacting with a sensor.
Figure 16B:
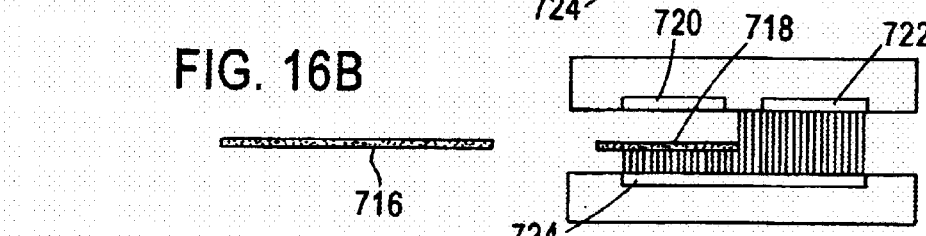
Figure 16C:
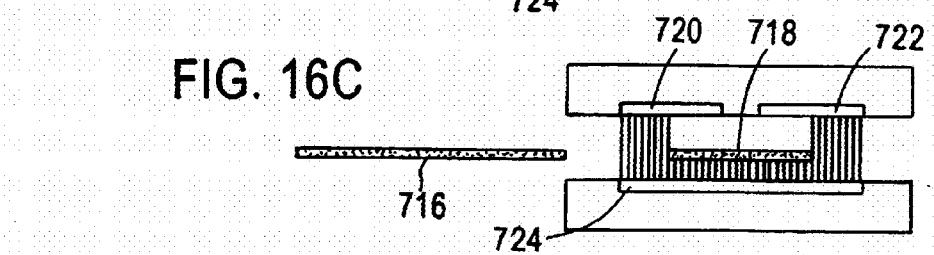
Figure 16D:
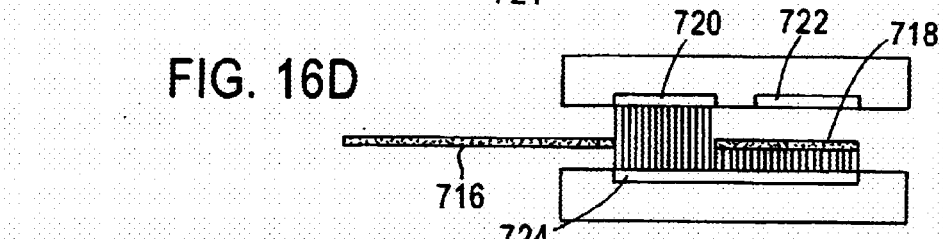
Figure 16E:
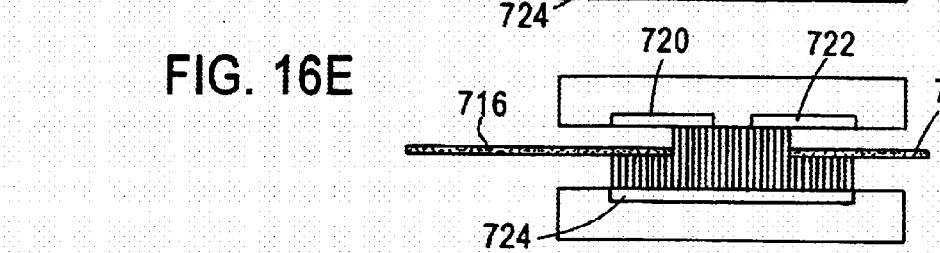
Figure 16F:
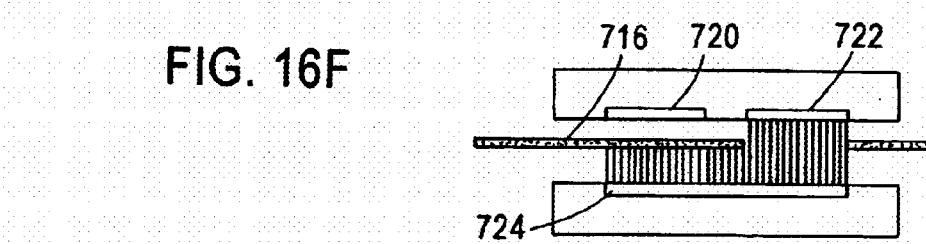
Figure 16G:
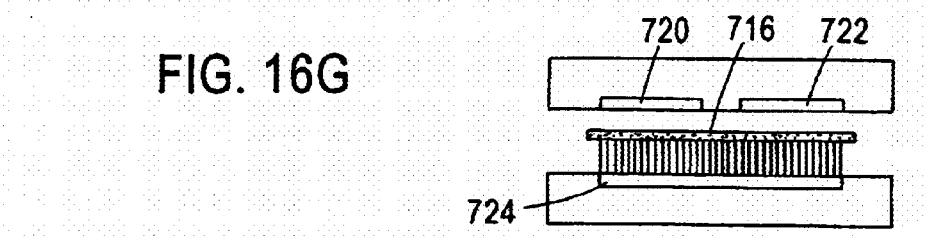

FIG. 15 is a top view of the tape loading mechanism of the present invention. FIG. 15 depicts the hub filler 616 aligned inside the take-up reel 705. Accordingly, the tab 706 is inside the position sensor 702.

In embodiments of the present invention, the position sensors 702, 704 are optical sensors and the tabs 706, 710 have apertures that interact with the position sensors. In some embodiments, the position sensors 702 and 704 are differential hall effect sensors and the tabs 706, 710 are metallic veins.

One of ordinary skill in the art will appreciate other types of position sensors and tabs that can be used to accurately detect the position of the hub filler during loading and unloading of tape from a tape cartridge to a take-up reel. Such sensors would include a sensing element that would detect the position of the hub filler, preferably without physical contact. Preferably, the position sensors manipulate electromagnetic phenomena (i.e. light or magnetic fields) such that the tabs interact with the position sensors without friction to indicate the position of the hub filler 616. Further, one of ordinary skill in the art would appreciate the use of other forms of electro-magnetic fields to detect the position of the hub filler of the tape loading mechanism of the present invention.

FIGS. 16A–16G depict an exemplary embodiment of the present invention, wherein the position sensor is an optical sensor and the tab includes an aperture. FIGS. 16A–16G are cross-sectional views of the optical sensor and the aperture in different stages of the aperture passing through the optical sensor. The optical sensor is a bi-cell arrangement comprising a light emitting element 724 and two photocells 720, 722. The first photocell 720 is adjacent to the second photocell 722 and are opposite from a light emitting element 724. The tab comprises two parts; a first leading edge 718 and a trailing edge 716. The aperture 717 is between the leading edge 718 and the trailing edge 716. As the aperture 717 moves through the optical sensor, the leading edge 718 and the trailing edge 716 sequentially block light emitted by the light emitting element 724 from being received at the first photocell 720 and second photocell 722. Each photocell 720, 722 outputs a voltage according to the intensity of light received by each photocell 720, 722 from the light emitting element 724. The voltages output from the photocells 720, 722 are electrically connected to a guide arm controller (not shown).

Figure 17:
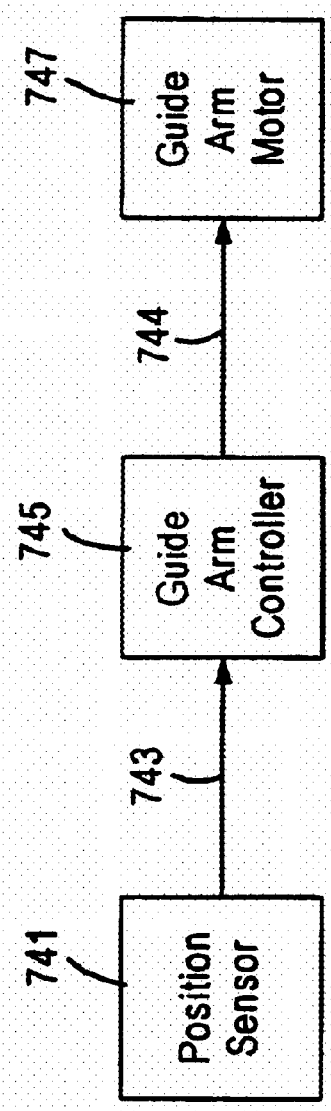
FIG. 17 is a block diagram of a guide arm motor controller coupled to both a position sensor and a guide arm motor.

FIG. 17 is a block diagram of a guide arm controller 745. FIG. 17 depicts the relationship between the guide arm controller 745, the position sensor 741, and the guide arm motor 747. The guide arm motor 747 drives a guide arm which drives a hub filler 616. The guide arm controller 745 is electrically coupled to position sensor 741. The controller 745 receives information from the position sensor 741 and uses this information to control the guide arm motor 747. The sensor output 743 is a feedback signal that the guide arm controller 745 utilizes to determine the appropriate guide arm motor input 744 to control the guide arm motor 747 such that the position of a hub filler 616 can be accurately controlled. The guide arm controller 745 also controls the guide arm motor 747, according to the particular function of the hub filler 616. For instance, when a hub filler 616 attaches to a leader pin at a removable tape cartridge, the guide arm controller 745 will utilize the position sensor output 743 to accurately pick up the leader pin at a predetermined position. After the leader pin has been picked up at the predetermined position, the guide arm controller 745 will control the guide arm motor through the guide arm motor input 744 to deliver the end of the tape from a removable tape cartridge to a take-up reel. This operation will not require feedback from the position sensor 741. In embodiments of the present invention, a plurality of position sensors will be located throughout the tape drive at points where accurate positioning of a hub filler 616 is required. Each one of the plurality of position sensors will be individually coupled to the guide arm controller 745, each providing separate feedback. Accordingly, position sensor 741 and position sensor output 743 are exemplary of only one of the plurality of position sensors.

In the bi-cell sensor arrangement, the guide arm controller 745 applies an algorithm for determining the exact position of the hub filler by processing the voltage output from the first photocell 720 and the second photocell 722. In one embodiment, the algorithm uses a ratio that is the difference of the voltage continuously read from photocell 720 and photocell 722 divided by the constantly held sum of the voltage of photocell 720 and photocell 722 when an aperture is not obstructing light from being received from the light emitting element 724 into photocells 720, 722. The following is an equation representative of the algorithm, wherein A is the continuous output from photocell 720 and B is the continuous output of photocell 722.

$$\text{Sensor Output} = \frac{A - B}{A + B}$$

Figure 18:
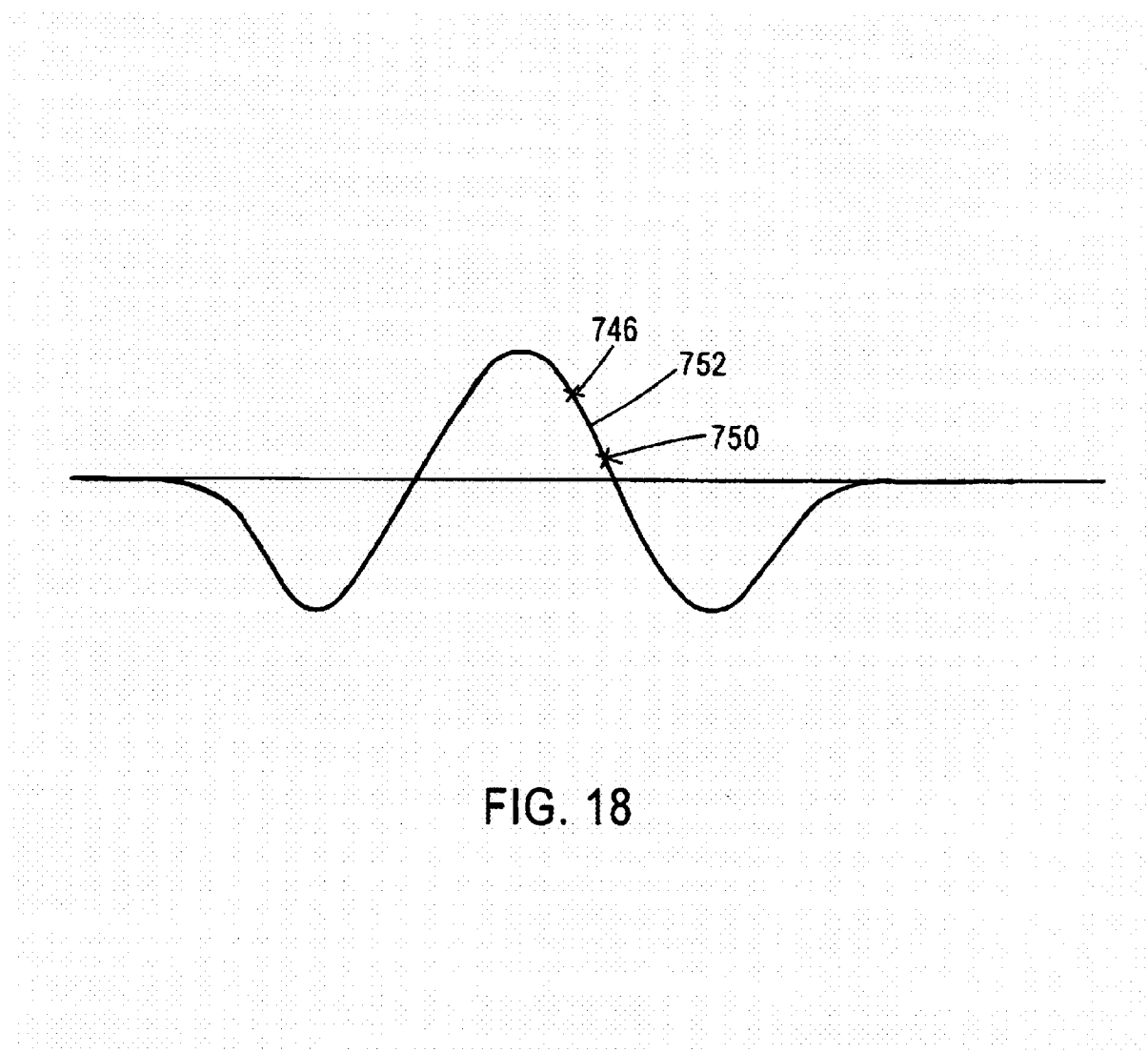
FIG. 18 depicts an exemplary feed back signal.

FIG. 18 is an output signal from a bi-cell arrangement. Each of the points 746, 750, 752 on the graph of the output signal represent a precise position of the hub filler. The guide arm controller 745 interprets the signal from the bi-cell arrangement to control the position of the hub filler.

The use of the sensors in the embodiments of the present invention provides more precise control of the movements employed in loading a tape in a tape drive. This precise control permits minor adjustments of the alignment of a hub filler axle with a hub filler, as seen in FIGS. 6–9, without placing total reliance on an encoder.

The present invention provides an improved method of loading a tape from a single reel tape cartridge into a take-up reel. This is accomplished, in part, by sensing the position of a hub filler as it enters a take-up reel and when the hub filler attaches to a tape leader pin. The sensing of the position of the hub filler mitigates problems of conventional tape drive mechanisms that result from small misalignments of the axis of the hub filler axle with the axis of the take-up reel. Also, small misalignments of the hub filler at the tape cartridge result in inconsistencies of the hub filler attaching the tape and the tape cartridge.

Although the present invention has been described and illustrated in detail, it is to be clearly understood that the same is by way of illustration and example only, and is not to be taken by way of limitation. The scope of the present invention being limited only by the terms of the appended claims.

What is claimed is:

1. A tape loading device comprising:

a guide arm that loads a take-up reel with tape from a tape cartridge; and means for sensing the position of the guide arm.

2. The tape loading device of claim 1, further comprising:
a guide rail extending between a tape cartridge to an interior of the take-up reel;
an opening in the take-up reel configured to receive a hub filler; and
a hub filler attached between the guide rail and the guide arm, wherein the guide arm drives the hub filler on the guide rail between said opening in the take-up reel to said tape cartridge.

3. The tape loading device of claim 1, wherein the means for sensing the position of the guide arm includes a tab attached to the guide arm and at least one sensor.

4. The tape loading device of claim 3, wherein the tab is arranged to induce electro-magnetic interference in the at least one sensor.

5. The tape loading device of claim 4, wherein;
the at least one sensor comprises a first photocell, a second photocell, and a light emitting element spaced from the first and second photocells so as to allow the tab to pass between the first and second photocells and the light emitting element;
the first and second photocells are arranged adjacent to one another;
the first and second photocells each output a voltage according to the intensity of light received by each photocell from the light emitting element;
the light emitting element is arranged across from the first and second photocells such that the first and second photocells are fully covered with light from the light emitting element, in the absence of the tab between the first and second photocells and the light emitting element;
the tab has an aperture sized such that the aperture will allow approximately the equivalent of the area of only one of the first and second photocells to receive light from the light emitting element when the aperture is fully between the first and second photocells and the light emitting element;
the tape loading device further comprising:
a guide arm controller coupled to a voltage output of the at least one sensor;
a motor that drives the guide arm, the motor being coupled to the guide arm controller;
the guide arm controller including logic for determining the position of the guide arm by monitoring the voltage output from the first and second photocells and controlling the motor according to the determined position of the guide arm.

6. The tape loading device of claim 5, wherein the guide arm controller determines the position of the guide arm by dividing the difference between voltage outputs of the first photocell and the second photocell by the sum of the voltage outputs of the first photocell and the second photocell.

7. The tape loading device of claim 3, wherein the at least one sensor includes multiples cells that independently interact with the tab.

8. The tape loading device of claim 7, wherein each of the cells provides an output, the outputs from the cells being combinable to determine the position of the guide arm.

9. The tape loading device of claim 1, wherein the means for sensing the position of the guide arm comprises:
a first optical sensor, wherein the first optical sensor is attached to the tape loading device proximate to a removable tape cartridge; and
a second optical sensor, wherein the second optical sensor is attached to the tape loading device, proximate to the take-up reel.

10. An apparatus for loading a take-up reel with tape from a removable tape cartridge comprising:
a hub filler for transporting an end of a tape from the tape cartridge to the take-up reel,
a guide rail extending between the removable tape cartridge and the take-up reel, the hub filler travelling on the guide rail;
a guide arm coupled to the hub filler and driving the hub filler along the guide rail; and
a sensor that detects the position of the hub filler, the sensor including multiple cells that independently interact with the guide arm to detect the position of the hub filler.

11. The apparatus of claim 10, wherein:
the sensor comprises a light emitting element and the multiple cells include a first photocell arranged opposite from the light emitting elements the first photocell outputting a voltage in response to intensity of light received from the light emitting element;
the apparatus further comprising:
a tab, with an aperture, attached to the guide arm such that the tab moves between the first photocell and the light emitting element to block at least a portion of light emitted from the light emitting element from being received by the first photocell; and
a motor that drives the guide arm;
a guide arm controller coupled to the first photocell and to the motor, wherein the guide arm controller controls the motion of the guide arm responsive to the first photocell.

12. The apparatus of claim 11, wherein:
the multiple cells include a second photocell arranged adjacent the first photocell; wherein:
the light emitting element is spaced from the first and second photocells such that the first and second photocells are fully covered with light from the light emitting element, in the absence of the tab between the first and second photocells and the light emitting element;
the aperture is sized so that the aperture will allow approximately the equivalent of the area of only one of the first and the second photocells to receive light from the light emitting element, when the tab is between the first and second photocells and the light emitting element;
the guide arm controller is responsive to voltage output from the first and second photocells by dividing a difference between voltage outputs of the first photocell and the second photocell by a sum of the voltage outputs of the first photocell and the second photocell.

13. The apparatus of claim 10 wherein:
the sensor includes an optical sensor that is attached to the take up reel, the optical sensor having the multiple cells; and
a tab with an aperture is attached to the guide arm and is arranged to induce optical interference in the optical sensor.

14. A method for loading a take-up reel with tape comprising the steps of:
driving a hub filler into a take-up reel with a guide arm; and detecting
the position of the guide arm with a sensor having multiple cells that independently interact with the guide arm.

15. The method of claim 14, wherein the at least one sensor comprises a sensor that does not require physical contact.

16. The method of claim 14, wherein the sensor is an optical sensor.

17. The method of claim 14, wherein:

the sensor comprises a first photocell, a second photocell, and a light emitting element;

the first and second photocells are arranged adjacent to one another and opposite the light emitting element;

the first and second photocells each have a voltage output that is responsive to the intensity of light received from the light emitting element;

a tab with an aperture attached to the guide arm such that the tab can travel between the first and second photocells and the light emitting element;

the tab is sized to allow approximately the equivalent of the area of one of the first and second photocells to receive light from the light emitting element, when the aperture is between the first and second photocells and the light emitting element; and a guide arm controller is coupled to the voltage outputs of the first and second photocell and to a motor that drives the guide arm.

18. The method of claim 17, wherein the step of detecting the position of the guide arm with at least one sensor comprises the steps of:

continuously determining a first value in the guide arm controller that is the difference between the voltage output of the first photocell and the voltage output of the second photocell;

continuously determining a second value in the guide arm controller that is the sum of the voltage output of the first photocell and the voltage output of the second photocell;

continuously determining a third value in the guide arm controller that is the first value divided by the second value; and controlling the motor according to the third value.

* * * * *